US008365169B1

(12) United States Patent
Watson et al.

(10) Patent No.: US 8,365,169 B1
(45) Date of Patent: Jan. 29, 2013

(54) MIGRATING A VIRTUAL MACHINE ACROSS PROCESSING CELLS CONNECTED TO AN INTERCONNECT THAT PROVIDES DATA COMMUNICATION WITHOUT CACHE COHERENCY SUPPORT

(75) Inventors: Brian J. Watson, Chesapeake, VA (US); Bret A. McKee, Fort Collins, CO (US); Chris D. Hyser, Victor, NY (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 12/236,244

(22) Filed: Sep. 23, 2008

Related U.S. Application Data

(60) Provisional application No. 61/010,688, filed on Jan. 10, 2008.

(51) Int. Cl.
*G06F 9/455* (2006.01)
(52) U.S. Cl. ............................................. 718/1
(58) Field of Classification Search .................. 718/1
See application file for complete search history.

(56) References Cited

U.S. PATENT DOCUMENTS

| | | | |
|---|---|---|---|
| 5,510,934 A | | 4/1996 | Brennan et al. |
| 6,075,938 A | | 6/2000 | Bugnion et al. |
| 6,760,815 B1 * | | 7/2004 | Traversat et al. ............. 711/135 |
| 6,874,066 B2 * | | 3/2005 | Traversat et al. ............. 711/135 |
| 7,203,944 B1 | | 4/2007 | van Rietschote et al. |
| 7,373,451 B2 * | | 5/2008 | Lam et al. ........................ 711/6 |
| 7,383,405 B2 * | | 6/2008 | Vega et al. ..................... 711/162 |
| 7,890,689 B2 * | | 2/2011 | Lam et al. ........................ 711/6 |
| 7,904,692 B2 * | | 3/2011 | Mukherjee et al. ........... 711/203 |
| 2001/0037419 A1 | | 11/2001 | Hagersten |
| 2006/0005189 A1 * | | 1/2006 | Vega et al. ........................ 718/1 |
| 2006/0195715 A1 | | 8/2006 | Herington |
| 2007/0043860 A1 | | 2/2007 | Pabari |
| 2007/0156964 A1 | | 7/2007 | Sistla |
| 2007/0280243 A1 * | | 12/2007 | Wray et al. ..................... 370/392 |
| 2008/0196026 A1 * | | 8/2008 | Azagury et al. ............... 718/100 |
| 2008/0225875 A1 * | | 9/2008 | Wray et al. ..................... 370/419 |

OTHER PUBLICATIONS

Free On-Line Dictionary of Computer (FOLDOC) © 2002. Search Term: virtual machine www.foldoc.org.*
Jones et al., "Geiger: Monitoring the Buffer Cache in a Virtual Machine Environment", Oct. 2006, ACM, ASPLOA '06, pp. 14-24.*

* cited by examiner

*Primary Examiner* — Aimee Li

(57) ABSTRACT

A system includes an interconnect, processing cells connected to the interconnect, the processing cells containing corresponding cache memories and corresponding virtual machines, and a storage cell connected to the interconnect. The storage cell stores data portions that correspond to different ones of the processing cells, and the data portions are owned by individual ones of the processing cells to enable data communication over the interconnect without cache coherency support. A first and second of the processing cells are configured to migrate a virtual machine from the first processing cell to the second processing cell, where the migrated virtual machine in the second processing cell is configured to retrieve virtual machine data from a corresponding one of the data portions in the storage cell.

21 Claims, 3 Drawing Sheets

MIGRATING A VIRTUAL MACHINE ACROSS PROCESSING CELLS CONNECTED TO AN INTERCONNECT THAT PROVIDES DATA COMMUNICATION WITHOUT CACHE COHERENCY SUPPORT

CROSS REFERENCE TO RELATED APPLICATIONS

This application claims the benefit of U.S. Provisional Application Ser. No. 61/010,688, filed Jan. 10, 2008, titled "Migrating A Virtual Machine Across Processing Cells Connected To An Interconnect That Provides Data Communication Without Cache Coherency Support"

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer For enhanced performance, virtual machines can be provided on multiple computers that are interconnected by a network. Under certain scenarios, migration of virtual machines between or among physical machines may be desirable. However, conventional mechanisms for migrating virtual machines do not efficiently move data associated with migrated virtual machines between the physical machines involved in the migration.

BRIEF DESCRIPTION OF THE DRAWINGS

Some embodiments of the invention are described, by way of example, with respect to the following figures.

DETAILED DESCRIPTION

Figure 1:
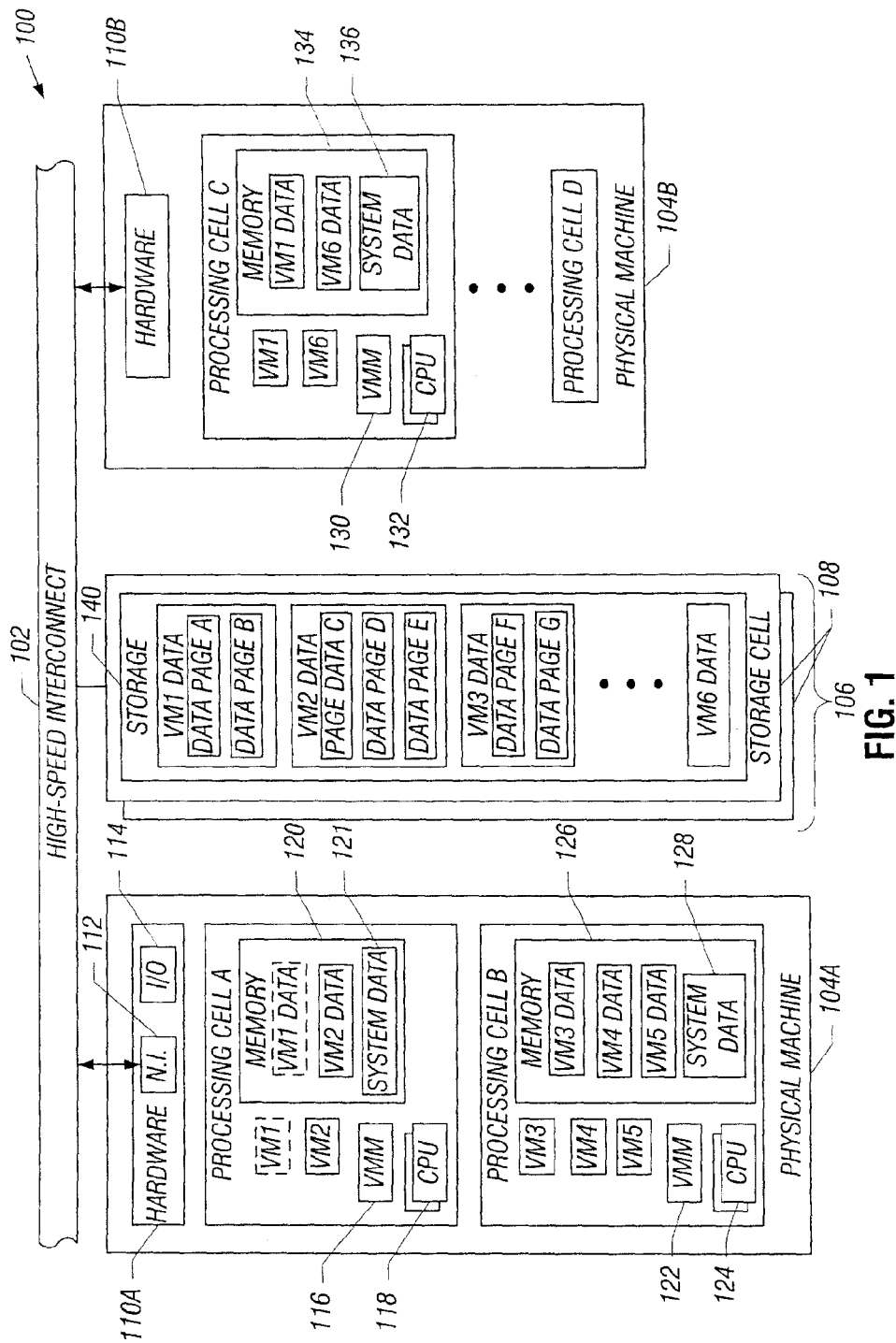
FIG. 1 is a block diagram of an example arrangement including physical machines having processing cells, virtual machines provided in the processing cells, and a global storage pool, in accordance with an embodiment.

In accordance with some embodiments, migration of a virtual machine can be efficiently accomplished by using a global storage pool that contains data associated with the migrated virtual machine. The global storage pool (which can be implemented with one or more storage cells) is connected to a high-speed interconnect (e.g., backplane, bus, serial link, etc.). Moreover, processing cells that contain corresponding groups of one or more virtual machines are also connected to the high-speed interconnect. The processing cells contain corresponding cache memories that can store data associated with respective virtual machines. The global storage pool is the main storage for the virtual machine data, whereas the cache memories in the processing cells are used to store copies of the virtual machine data.

Migration of a virtual machine refers to moving the state of the virtual machine from one processing cell to another processing cell. The state of the virtual machine includes content of registers of various hardware devices (e.g., CPUs, I/O devices, and so forth). The processing cells and storage cell (s), along with the high-speed interconnect, can be part of a server rack or server cabinet, where relatively high-speed communications can occur among the processing cells, as well as between processing cells and storage cells over the high-speed interconnect.

In accordance with some embodiments, to reduce the amount of traffic and to reduce processing delays, data communications over the high-speed interconnect are performed without providing cache coherency support on the high-speed interconnect. Not providing cache coherency also reduces hardware complexity, which has many benefits including reduced engineering and fabrication costs, less risk of hardware bugs, and perhaps lower power consumption due to less logic (which corresponds to less transistors) used for read and write operations. The need for cache coherency can be avoided by assigning individual data portions in the global storage pool to corresponding processing cells. In other words, each processing cell owns a corresponding data portion in the global storage pool, such that any data portion is not shared by processing cells so that coherency of data contained in the global storage pool among multiple processing cells is not an issue. Without cache coherency support on the high-speed interconnect, cache coherency mechanisms would not have to be provided. This is beneficial for enabling high-speed communications since cache coherency mechanisms tend to slow down data communication speeds, since snooping would have to be performed by multiple processing cells. Snooping results in associated cache coherency traffic (e.g., indications of cache hits or misses) that adds to overall traffic on the high-speed interconnect, and snooping also involves handshaking between processing cells.

Migration of a virtual machine from a first processing cell to a second processing cell can simply be achieved by quiescing the virtual machine to be migrated on the fist processing cell, and flushing any dirty (modified) cache content in cache memory associated with the virtual machine in the first processing cell to the global storage pool. The virtual machine can then be resumed on the second processing cell, at which time data associated with the virtual machine can be gradually retrieved from the global storage pool. "Gradually" retrieving data refers to retrieving portions of the data over time, rather than all at once.

A "processing cell" refers to a collection of software and certain hardware, such as one or more central processing units (CPUs), memory (implemented with any one of various types of memory devices), and other hardware resources. Each processing cell is capable of including one or more virtual machines, where a virtual machine refers to some partition or segment (made up of software and/or hardware) of the processing cell. The virtual machine virtualizes or emulates a processing cell. From the perspective of a user, a virtual machine looks just like a processing cell.

Note that multiple processing cells can together form a physical machine, where the physical machine in turn can include additional hardware, such as input/output (I/O) devices. The multiple processing cells of the physical machine can share such additional hardware.

A system can include multiple physical machines, each with a corresponding group of one or more processing cells. Each processing cell can in turn include a corresponding group of one or more virtual machines.

FIG. 1 illustrates an example arrangement of a system 100 (e.g., server rack, server cabinet, storage subsystem, communications subsystem, etc.). The system 100 has a high-speed interconnect 102 (e.g., server rack backplane, server cabinet backplane, bus, serial link, etc.) that interconnects multiple physical machines 104A and 104B. In one example, the physical machines 104A, 104B can be server blades, storage blades, communications cards, and so forth, which can be inserted into slots or receptacles of the system 100. Although just two physical machines 104A, 104B are depicted, it is noted that the system 100 can include additional physical machines. Moreover, the system 100 includes a global storage pool 106, which can be implemented on another blade, for example. The global storage pool 106 includes one or more storage cells 108 for storing data associated with processing cells of the system 100.

The physical machine 104A includes processing cell A and processing cell B, while the physical machine 104B includes processing cell C and processing cell D. Although two processing cells are depicted as being part of each corresponding physical machine, it is noted that a physical machine can include just one processing cell, or more than two processing cells in other implementations.

Each physical machine 104A, 104B includes corresponding hardware 110A, 110B. In the example of FIG. 1, the hardware 110A includes a network interface 112 and other I/O devices 114. The network interface 112 allows the physical machine 104A to communicate over the high-speed interconnect 102. The hardware 110B may contain similar components. Each hardware 110A, 110B is shared by processing cells of the corresponding physical machine. For example, processing cells A and B share hardware 110A, and processing cells C and D share hardware 110B.

As depicted in FIG. 1, processing cell A initially includes virtual machine VM1, virtual machine VM2, a virtual machine monitor (VMM) 116, and one or more central processing units (CPUs) 118. Also, processing cell A includes a memory 120 that can be used to store data associated with software of the processing cell A, in this case, data relating to VM1, VM2, the VMM 116, and other software (not shown) in processing cell A. In the example of FIG. 1, the memory 120 stores data associated with VM1 (referred to as "VM1 data"), data associated with VM2 ("VM2 data"), and system data 121. The system data 121 is data associated with software in processing cell A other than software associated with VM1 and VM2. For example, the system data 121 can be data for VMM 116.

Note that VM1 and the VM1 data are indicated with dashed boxes because VM1 will be migrated to processing cell C in physical machine 104B and VM1 data will be removed from the memory 120 of processing cell A after VM1 has been migrated (discussed further below).

Each virtual machine can include one or more software applications, an operation system, and one or more device drivers (which are typically part of the operating system). The operating systems of different virtual machines can be the same or can be different.

The virtual machines within a processing cell are designed to share the physical resources of the processing cell (e.g., CPU(s) 118 and memory 120 in processing cell A).

The VMM 116, also called a hypervisor, manages the sharing (by virtual machines) of the physical resources within a processing cell. The VMM 116 virtualizes the physical resources of the processing cell. Also, the VMM 116 intercepts requests for resources from operating systems in the respective virtual machines so that proper allocation of the physical resources of the processing cell can be performed. For example, the VMM 116 can manage memory access, I/O device access, and CPU scheduling for virtual machines. Effectively, the VMM 116 provides an interface between the operating system of each virtual machine and the underlying hardware of the processing cell (and of the physical machine in which the processing cell is contained).

Processing cell B contains similar elements as processing cell A, including VM3, VM4, VM5, a VMM 122, one or more CPUs 124, and a memory 126 that contains VM3 data, VM4 data, VM5 data, and system data 128.

Processing cell C contains VM1 (after migration from processing cell A) and VM6, as well as VMM 130 and one or more CPUs 132. Processing cell C also includes memory 134 to store VM1 data (when retrieved from the global storage pool 106 after migration of VM1 to processing cell C), VM6 data, and system data 136.

Processing cell D also contains similar elements as the other processing cells depicted in FIG. 1.

Each storage cell 108 in the global storage pool 106 contains corresponding data pages (more generally referred to as "data portions"). A data page (or more generally "data portion") is a particular portion of a storage 140 in the storage cell 108. Each data page is assigned to a corresponding processing cell, and such data page is not shared with other processing cells. Alternatively, as a result of virtual machine migration, ownership of a data page can be transferred between processing cells. Thus, for example, processing cell A owns data page A in the storage 140, processing cell B owns data page B, processing cell C owns data page C, and processing cell D owns data page D. In this manner, the data pages (or more generally "data portions") can be considered discrete data pages (or "discrete data portions").

The data for a single virtual machine can include one or multiple data pages. Thus, for example, VM1 data contains data page A and data page B; VM2 data contains data page C, data page D, and data page E; VM3 data contains data page F and data page G; and so forth. Note that when a virtual machine (e.g., VM1) is migrated from one processing cell to another processing cell, then ownership of the data pages associated with VM1 data is transferred between the processing cells.

In the arrangement depicted in FIG. 1, a portion of each memory within a respective processing cell is used as a cache memory. In processing cell A, for example, the portion of the memory 120 used to store VM1 data and VM2 data makes up the cache memory of processing cell A. The system data 121 includes data associated with software not in the virtual machines in processing cell A; as a result, the system data 120 does not have to be moved from processing cell A as a result of virtual machine migration. For example, the VMM 116 in processing cell A is not an entity that is migrated across processing cells. Also, note that there may be "pinned" VMs that are not migrated—therefore, data for such pinned VMs do not have to be stored in cache memory or in the global storage pool.

The VM data contained in the cache memory of a processing cell is considered to be a copy of the VM data stored in the corresponding data page(s) in the global storage pool 106. In some embodiments, all accesses (reads and writes) by a virtual machine are performed against the copy of the VM data stored in the cache memory of the processing cell. In other words, the virtual machine does not perform reads from, or writes to, the VM data stored in the global storage pool 106. Writes to the copy of the VM data in the cache memory of the processing cell will cause the VM data to become modified (dirty) with respect to the corresponding global VM data. As a result, at some point, such as prior to migration (and/or during migration) of the corresponding virtual machine, the dirty (modified) VM data is flushed back to the global data page. Alternatively, flushing of dirty VM data can also be performed periodically as part of a housekeeping task.

As noted above, since each data page is owned individually by a processing cell, cache coherency in data communications over the high-speed interconnect 102 among multiple processing cells does not have to be supported.

It is also noted that CPUs of the processing cells contain internal caches (internal to the CPUs). For example, some CPUs can include up to three levels of internal caches. The cache memory provided by the memory (120, 126, 134) in each processing cell is considered to be an external cache memory at a level above the highest level internal cache of each CPU. For example, if there are three levels of internal caches in the CPUs, then the external cache memory is considered to be a fourth level cache. Because the CPUs share the memory of their processing cell, the internal caches have cache coherency mechanisms amongst themselves.

Figure 2:
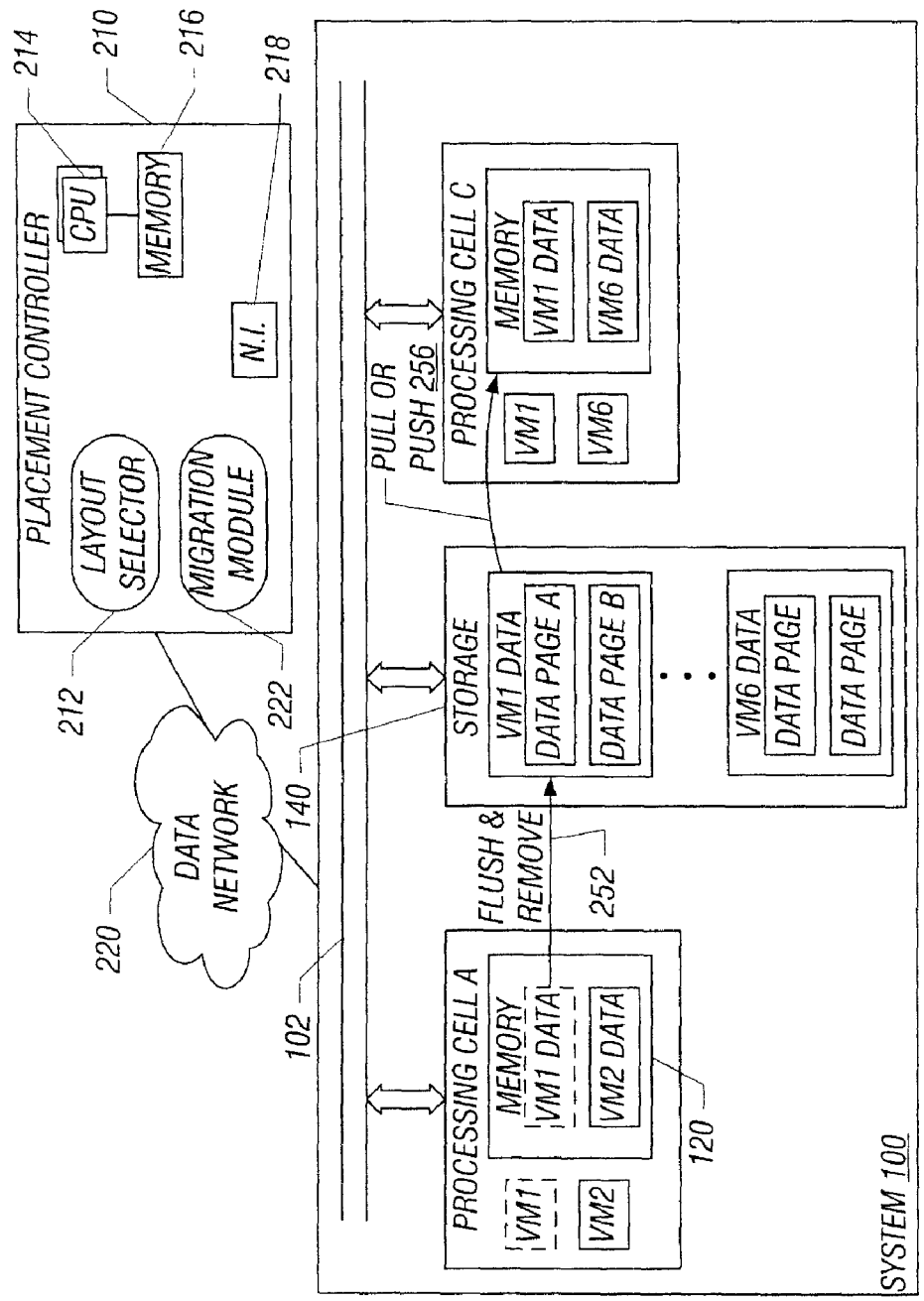
FIG. 2 illustrates migration of a virtual machine from one processing cell to another processing cell, where data contained in the global storage pool is used as part of the migration, in accordance with an embodiment.
Figure 3:
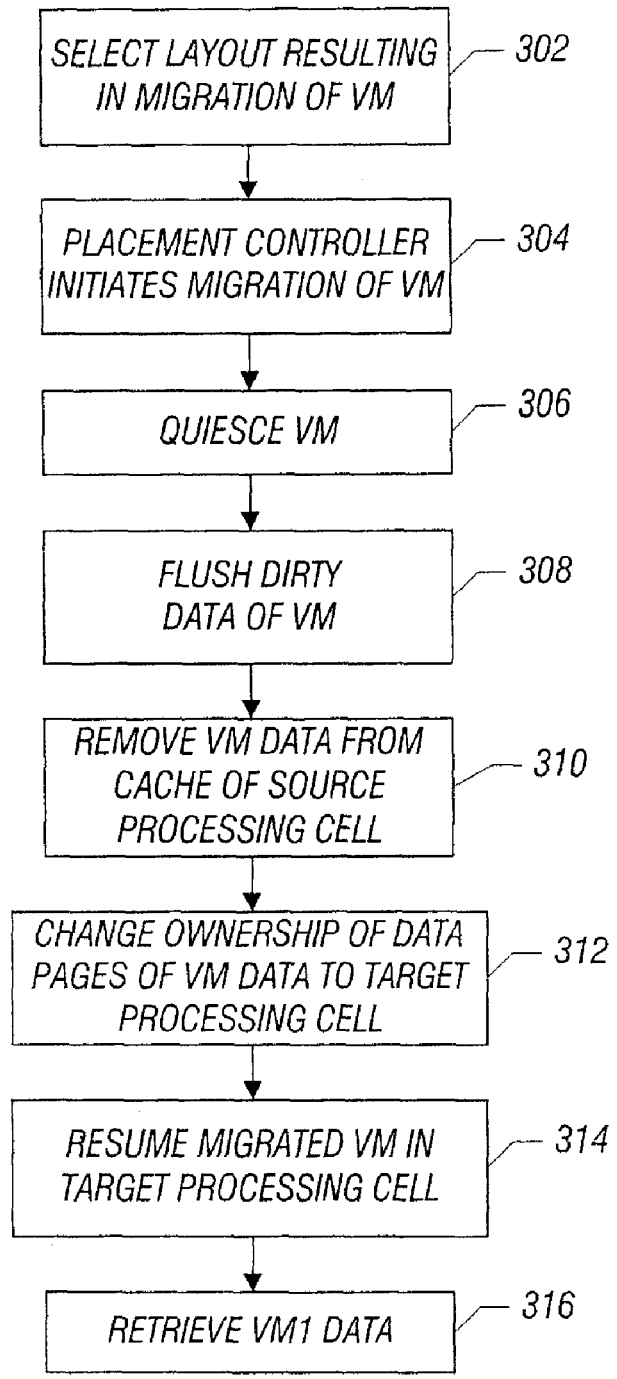
FIG. 3 is a flow diagram of a process of migrating a virtual machine according to an embodiment.

FIG. 2 illustrates an example flow for migrating VM1 from processing cell A to processing cell C, which are coupled to the high-speed interconnect 102 of the system 100. The example flow depicted in FIG. 2 is discussed in conjunction with the flow diagram of FIG. 3. The process represented in FIG. 3 are performed by a placement controller 210 (FIG. 2) and the processing cells A and C. The migration can also work with human-initiated migrations that do not involve an automated placement controller. Although the placement controller 210 is depicted as being outside the system 100, note that the placement controller 210 can alternatively be within the system 100, such as part of some processing cell or virtual machine.

Initially, a layout of virtual machines is selected (at 302) by the placement controller 210, where the selected layout can result in migration of at least one virtual machine across processing cells. A "layout" of virtual machines refers to placement of the virtual machines on processing cells. As discussed further below, the placement controller 210 considers various criteria when selecting a layout of virtual machines.

Layout selection is performed by a layout selector 212 in the placement controller 210. The layout selector 212 is a software module that is executable on one or more CPUs 214 in the placement controller 210. The one or more CPUs 214 are connected to memory 216. The placement controller 210 is able to communicate over a data network 220 through a network interface 218. The placement controller 210 is able to communicate with the system 100 over the data network 220.

Upon detecting that a selected layout results in migration of at least one virtual machine (e.g., VM1 in FIG. 2), the placement controller initiates (at 304) migration of this virtual machine. The placement controller 210 includes a migration control module 222 that is able to control migration of a virtual machine from one processing cell to another processing cell. The migration control module 222 can send commands to the appropriate control entities in the respective processing cells, where the control entities can be the VMMs of the processing cells, or other entities. Thus, the migration control module 222 is able to cooperate with the processing cells to cause migration of a virtual machine across processing cells.

In response to command(s) received by the processing cell A to initiate migration of VM1, VM1 is quiesced (at 306). Quiescing a virtual machine refers to suspending the execution of the virtual machine (e.g., by commanding the VMM to cease scheduling VM1). Next, any VM1 dirty (modified) data in the cache memory is flushed (at 308) from the cache memory of processing cell A to the corresponding data page (s) in the global storage pool 106. Flushing of the dirty data is represented as 252 in FIG. 2. Flushing of the dirty data can be performed once before the quiescing at 306, and once after the quiescing to reduce downtime of the VM. Alternatively, the flush can just be performed once, after VM1 has been quiesced.

The VM data of the virtual machine (VM1) that is being migrated is then removed (at 310) from the cache memory of the source processing cell (in this example processing cell A). Note that since VM1 is being moved from a source processing cell to a target processing cell, ownership of the data pages of the VM1 data in the global storage pool 106 is transferred (at 312) from the source processing cell to the target processing cell (processing cell C). This enables the migrated virtual machine (VM1) in processing cell C to access the VM1 data.

Next, the migrated virtual machine (VM1) is resumed (at 314) in the target processing cells (processing cell C). Next, the resumed virtual machine retrieves (at 316) VM1 data from the global storage pool 106. Retrieval of data by VM1 from the global storage pool 106 is represented as 256 in FIG. 2. Note that the entire data image does not have to be retrieved at one time; instead, portions of the VM1 data can be retrieved gradually to reduce load on the high-speed interconnect 102. The retrieval of VM1 data can use either a pull mechanism (where the virtual machine in the target processing cell requests retrieval of the data), or a push mechanism (where the global storage pool 106 pushes the VM1 data to the target processing cell).

The tasks of FIG. 3 may be provided in the context of information technology (IT) services offered by one organization to another organization. For example, the infrastructure (including the placement controllers, physical machines, and virtual machines of FIG. 1) may be owned by a first organization. The IT services may be offered as part of an IT services contract, for example.

By using techniques or mechanisms according to some embodiments, migration of virtual machines across processing cells is made more efficient, since the migrated virtual machine can be resumed on the target processing cell without first having to copy the entire memory image to the target processing cell. Moreover, by using a non-cache-coherent interconnect, complexity of the hardware and/or firmware to do reads and writes is reduced. By enhancing the speed at which virtual machines can be migrated, various opportunities are made possible. For example, a processing cell can be over-subscribed relative to resources guaranteed to each virtual machine, because it would take relatively little time to migrate work off the processing cell in the event of a load spike.

The placement controller 210 is able to determine an efficient placement of the virtual machines on corresponding physical machines based on predefined criteria (according to a target policy set by an enterprise, a user, an administrator, etc.). The predefined criteria according to the policy can include a target quality-of-service level to be provided, loading criteria (which specify some target loading level on a physical resource or machine), balancing criteria (which specify that load on physical machines should be balanced when possible), cooling criteria (which specify temperatures in physical machines that should not be exceeded), power criteria (which specify that power consumption should be reduced where possible), cost of migrating virtual machines, criteria indicating which virtual machines should be run on a common physical machine, criteria indicating which virtual machines should be run on different physical machines, criteria specifying a limit on frequency of virtual machine migration, and other criteria.

The placement controller 210 is able to determine whether the current state of the overall system (which includes the multiple physical machines) conforms to the policy. If the placement controller 210 determines that the state of the system does not conform to the policy, then the placement controller 210 can perform a re-evaluation to determine a different placement of virtual machines on physical machines to increase conformance to the policy.

If a different placement is determined by the placement controller 210 to be desirable, the placement controller 210 is able to select new layouts of virtual machines, where a new layout of virtual machines on physical machines is different from a prior layout of virtual machines on the physical machines. According to the new layout, the placement controller is able to perform migration of virtual machines from one physical machine to another physical machine. After placement of the virtual machines has been changed (by migration), the placement controller 210 can subsequently determine whether further migration should be performed. Note that workloads at the physical machines are continually changing. The placement controller 210 repeatedly checks (in a loop) whether the state of the system conforms to policy. In effect, the placement controller 210 provides a feedback-driven mechanism to control the mapping of virtual machines onto physical machines. This feedback-driven mechanism allows automated adjustments of placement of the virtual machines on physical machines. By automating the virtual machine placement control, relatively quick response times can be achieved in changing placements of virtual machines in response to observed or predicted events that affect conformance with policy.

Instructions of software described above (including the layout selector 212, migration control module 222, virtual machine software, VMM, and so forth, of FIG. 2) are loaded for execution on a processor (such as one or more CPUs 118, 124, 132, 214 in FIGS. 1 and 2). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
   an interconnect;
   processing cells connected to the interconnect, the processing cells containing corresponding cache memories and corresponding virtual machines, each of the virtual machines including a corresponding operating system and application; and
   a storage cell connected to the interconnect, the storage cell to store data portions that correspond to different ones of the processing cells, the data portions owned by individual ones of the processing cells to enable data communication over the interconnect without cache coherency support,
   wherein the cache memories are to store copies of virtual machine data also stored in the data portions of the storage cell,
   wherein a first and second of the processing cells are configured to migrate a particular one of the virtual machines from the first processing cell to the second processing cell, wherein the migrated virtual machine in the second processing cell is configured to retrieve virtual machine data from a corresponding one of the data portions in the storage cell.

2. The system of claim 1, wherein the virtual machines are to perform reads and writes to the copies of the virtual machine data stored in respective cache memories.

3. The system of claim 2, wherein the first processing cell is configured to flush a dirty copy of the virtual machine data corresponding to the migrated virtual machine to the corresponding one or more data portions in the storage cell.

4. The system of claim 3, wherein the first processing cell is configured to remove the virtual machine data corresponding to the migrated virtual machine from the first processing cell.

5. The system of claim 1, wherein the migrated virtual machine in the second processing cell is configured to gradually retrieve the virtual machine data from the corresponding one or more data portions in the storage cell.

6. The system of claim 1, further comprising a placement controller to select a layout of the virtual machines across the processing cells.

7. The system of claim 6, wherein the placement controller is configured to:
   determine that migration of one or more virtual machines is to occur according to the selected layout; and
   send one or more commands to at least some of the processing cells to effect migration of the one or more virtual machines.

8. The system of claim 1, wherein the first processing cell is configured to quiesce the migrated virtual machine in the first processing cell, and the second processing cell is configured to resume the migrated virtual machine in the second processing cell.

9. The system of claim 1, further comprising plural physical machines, wherein at least one of the physical machines includes plural ones of the processing cells.

10. The system of claim 9, wherein the physical machines comprise blades, and the system comprises a server to receive the blades.

11. The system of claim 10, wherein the interconnect comprises a backplane of the server.

12. A method comprising:
receiving, at a first processing cell, at least one command to migrate a virtual machine in the first processing cell to a second processing cell;
flushing modified virtual machine data in a cache memory of the first processing cell to a global storage pool, wherein the modified virtual machine data is written to the global storage pool over an interconnect on which cache coherency support is not provided, wherein the global storage pool contains discrete data portions owned by individual processing cells;
moving the virtual machine from the first processing cell to the second processing cell; and
retrieving, by the virtual machine in the second processing cell, the virtual machine data associated with the virtual machine from the global storage pool.

13. The method of claim 12, wherein moving the virtual machine from the first processing cell to the second processing cell comprises quiescing the virtual machine on the first processing cell, and resuming the virtual machine on the second processing cell, wherein the virtual machine includes an operating system and an application.

14. The method of claim 13, further comprising removing the virtual machine data associated with the migrated virtual machine from the first processing cell.

15. The method of claim 12, wherein retrieving the virtual machine data comprises retrieving the virtual machine data into a cache memory of the second processing cell.

16. The method of claim 12, further comprising:
after flushing the virtual machine data to the global storage pool, transferring ownership of one or more data portions associated with the virtual machine data from the first processing cell to the second processing cell.

17. The method of claim 12, further comprising:
storing, in the cache memory, virtual machine data associated with a second virtual machine in the first processing cell.

18. The method of claim 12, wherein moving the virtual machine comprises moving the virtual machine that includes an operating system and an application.

19. An article comprising at least one storage medium containing instructions that when executed cause a system to:
receive, at a first processing cell, at least one command to migrate a virtual machine in the first processing cell to a second processing cell;
flush modified virtual machine data in a cache memory of the first processing cell to a global storage pool, wherein the modified virtual machine data is written to the global storage pool over an interconnect on which cache coherency support is not provided, wherein the global storage pool contains discrete data portions owned by individual processing cells;
move the virtual machine from the first processing cell to the second processing cell; and
retrieve, by the virtual machine in the second processing cell, the virtual machine data associated with the virtual machine from the global storage pool.

20. The article of claim 19, wherein the instructions when executed cause the system to further:
store, in the cache memory, virtual machine data associated with a second virtual machine in the first processing cell.

21. The article of claim 19, wherein moving the virtual machine comprises moving the virtual machine that includes an operating system and an application.

* * * * *